United States Patent [19]

Fujii

[11] Patent Number: 5,161,902
[45] Date of Patent: Nov. 10, 1992

[54] MAGNETIC SEALING DEVICE FOR USE BETWEEN FIRST AND SECOND MAGNETIC MEMBERS WHICH ROTATE RELATIVE TO EACH OTHER

[75] Inventor: Akio Fujii, Hujisawa, Japan

[73] Assignee: Nippon Seiko Kabushiki Kaisha, Tokyo, Japan

[21] Appl. No.: 798,992

[22] Filed: Dec. 2, 1991

Related U.S. Application Data

[63] Continuation of Ser. No. 323,235, Mar. 14, 1989, abandoned, which is a continuation of Ser. No. 250,829, Sep. 29, 1988, abandoned.

[51] Int. Cl.$^5$ .......................... F16C 33/82; F16J 15/40
[52] U.S. Cl. ...................................... 384/446; 277/80; 277/135; 384/478
[58] Field of Search ................... 277/80, 135; 384/477, 384/133, 446, 478

[56] References Cited

U.S. PATENT DOCUMENTS

| 2,974,981 | 3/1961 | Vervest et al. | 277/80 |
|---|---|---|---|
| 4,293,137 | 10/1981 | Ezekiel | 277/80 |
| 4,340,233 | 7/1982 | Yamamura et al. | 277/80 X |
| 4,407,508 | 10/1983 | Raj et al. | 277/80 |
| 4,506,895 | 3/1985 | Raj | 277/80 |
| 4,526,381 | 7/1985 | Ezekiel | 277/80 |
| 4,628,384 | 12/1986 | Raj et al. | 277/80 X |

FOREIGN PATENT DOCUMENTS

| 107163 | 8/1980 | Japan | 277/80 |
|---|---|---|---|
| 61-13025 | 10/1985 | Japan . | |
| 61-44067 | 3/1986 | Japan . | |
| 62-31776 | 2/1987 | Japan | 277/80 |
| 62-110080 | 5/1987 | Japan . | |
| 62-195261 | 12/1987 | Japan . | |
| 875153 | 10/1981 | U.S.S.R. | 277/80 |
| 962707 | 9/1982 | U.S.S.R. | 277/80 |
| 2146079 | 4/1985 | United Kingdom | 277/80 |

OTHER PUBLICATIONS

Japanese Utility Model Publication No. 61-79070.
Japanese Utility Model Publication No. 58-191423.
Japanese Utility Model Publication No. 61-13025.
Japanese Utility Model Publication No. 62-204027.
Japanese Utility Model Publication No. 63-8419.
Japanese Utility Model Publication No. 63-139325.
Japanese Utility Model Publication No. 63-29944.

*Primary Examiner*—Allan N. Shoap
*Attorney, Agent, or Firm*—Foley & Lardner

[57] ABSTRACT

Installed between a housing and a shaft concentrically disposed with a space having a predetermined radial length therebetween so as to move relative to one another is a sealing device which comprises a ferrofluid seal device comprising a permanent magnet and a pair of pole pieces for supporting the magnet interposed therebetween, so that a ferrofluid is retained between the pole pieces at one end thereof and the shaft and that a radially outer air gap is provided at least one of the pole pieces at the other end thereof and the housing, whereby the magnetic flux path extending between the pole pieces at the other end thereof and the housing is eliminated.

25 Claims, 5 Drawing Sheets

MAGNETIC SEALING DEVICE FOR USE BETWEEN FIRST AND SECOND MAGNETIC MEMBERS WHICH ROTATE RELATIVE TO EACH OTHER

This application is a continuation of application Ser. No. 07/323,235, filed Mar. 14, 1989, which in turn is a continuation of application Ser. No. 250,829, filed Sep. 29, 1988, both now abandoned.

FIELD OF THE INVENTION

The present invention relates to a sealing device in which a ferrofluid is utilized.

BACKGROUND OF THE INVENTION

In the conventional magnetic disk device, a dusttight sealing device is used in a space between a shaft and a housing to seal its inside from an outside environment.

This sealing device is comprised of a pair of pole pieces and an annular permanent magnet sandwiched therebetween. There is a gap between the pole pieces and the shaft to hold a ferrofluid in the gap. In the sealing device, the pole pieces are directly secured to the housing which is of magnetic material, so that there is a magnetic flux path extending through one of the pole pieces, the housing and the other of the pole pieces. Consequently, the magnetic flux circuit to hold the ferrofluid is short-circuited by the magnetic flux path through the pole pieces and the housing, and the greater part of the magnetic flux from the permanent magnet flows into the housing.

For this reason, the density of the magnetic flux in the gap between the shaft and the pole pieces decreases, and the force maintaining the ferrofluid becomes weak. This gives rise to the problem of a striking decrease in the pressure resistance of the ferrofluid.

It is believed that this problem can be eliminated if the housing is constructed of a nonmagnetic material such as aluminum. However, this is no effective strategic solution for an antifriction bearing, in which the housing must be a magnetic material and could not be made from a nonmagnetic material.

Under these circumstances, a strategic solution has already been proposed with the premise that the housing is a magnetic body. This is the sealing device shown in FIG. 1, which shows a housing 1 made of magnetic body, a shaft 3 made of the same magnetic body, and a ferrofluid seal device 5, and a ring spacer 7 made from a nonmagnetic body interposed between the ferrofluid seal device 5 and the housing 1. The ferrofluid seal device 5 comprises an annular magnet 11 magnetized in the axial direction, and a pair of annular pole pieces 13 and 15 between which the magnet 11 is integrally inserted. A gap g is provided between the shaft 3 and the pole pieces 13 and 15 secured to the housing 1 through the ring spacer 7. A ferrofluid 9 made from an oil containing fine magnetic particles in the order of 0.001 μm in size is retained in the gap g by the magnetic field generated by the magnet 11.

However, in a sealing device with this type of configuration, not only the ferrofluid seal device 5 but also the ring spacer 7 must be incorporated in the housing 1, so that parts and material costs are high.

In addition, because the ring spacer 7 is interposed between the housing 1 and the ferrofluid seal device 5, an additional engagement section is required, so that the positional precision of the pole pieces 13 and 15 with respect to the shaft 3 is worsened. Specifically, a dimensional deviation is produced in the gap g around the shaft 3.

In addition, in the case of applying the ferrofluid seal device to the bearing assembly of the magnetic disk device as shown in FIG. 2, which has an inner race 17, an outer race 19 and balls 21, because the spacing between the inner race 17 and the outer race 19 is about 2 mm, which is extremely narrow, it would be difficult to install the seal device 5 and the ring spacer 7 with good precision between the inner race 17 and the outer race 19 so as to seal the lubricated section of a ball 21. If a desired precision is to be obtained, it is necessary to improve the precision of the processing of the pole pieces 13 and 15 and the ring spacer 7, which increases the cost of production.

SUMMARY OF THE INVENTION

An object of the present invention is to provide, with due consideration to the drawbacks of such conventional devices, a low priced sealing device which is easily installed with good precision even when the space is limited.

Another object of the present invention is to provide a sealing device by which foreign materials like a grease splash are completely prevented from passing through the sealing device.

These objects are accomplished in the present invention by the provision of a sealing device which is to be installed between a first magnetic member and a second magnetic member which are disposed with a space therebetween so as to move relative to one another, the space having a predetermined length, which sealing device comprises a ferrofluid seal device comprising a permanent magnet for generating a magnetic field, a pair of magnetically permeable pole pieces for supporting the permanent magnet interposed between them, the ferrofluid seal device secured to the first magnetic member such that a gap is provided between the two pole pieces and the second magnetic member, and a ferrofluid which is retained in the gap by the magnetic field, and at least one of the pole pieces, when the ferrofluid seal device is installed, is of a size to form a second gap between the pole piece and the first magnetic member.

In a preferred embodiment, the present invention contemplates a sealing device for use between a first magnetic member and a second magnetic member which have a peripheral surface respectively and are concentrically disposed with a space having a predetermined radial length provided between said peripheral surfaces so as to move relative to one another, comprising:

(a) an axially magnetized permanent magnet provided within said space between said first and second magnetic members and having first and second peripheral edges, (b) first and second magnetically permeable pole pieces axially juxtaposed within said space between said first and second magnetic members with said permanent magnet interposed therebetween, each being flat and having first and second peripheral edges, (c) a first radial gap defined between said first peripheral edges of said first and second pole pieces and said second magnetic member, (d) a ferrofluid retained within said first radial gap by magnetic forces generated from said permanent magnet, (e) a second radial gap defined between said peripheral surface of said first magnetic member and said second peripheral edge of at least one of said pole pieces and sized substantially larger than said first radial gap, (f) a support section for said single permanent magnet and said two pole pieces based on contact between said peripheral surface of said first magnetic member and at least one of said second peripheral edges of said permanent magnet and said pole pieces, whereby magnetic fluxes between said pole pieces and said first magnetic member are substantially reduced, and magnetic fluxes between said pole pieces and said second magnetic member are intensified.

Sealing devices wherein the first and second magnetic members comprise a housing and a shaft or an outer race and an inner race of a bearing are also contemplated.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
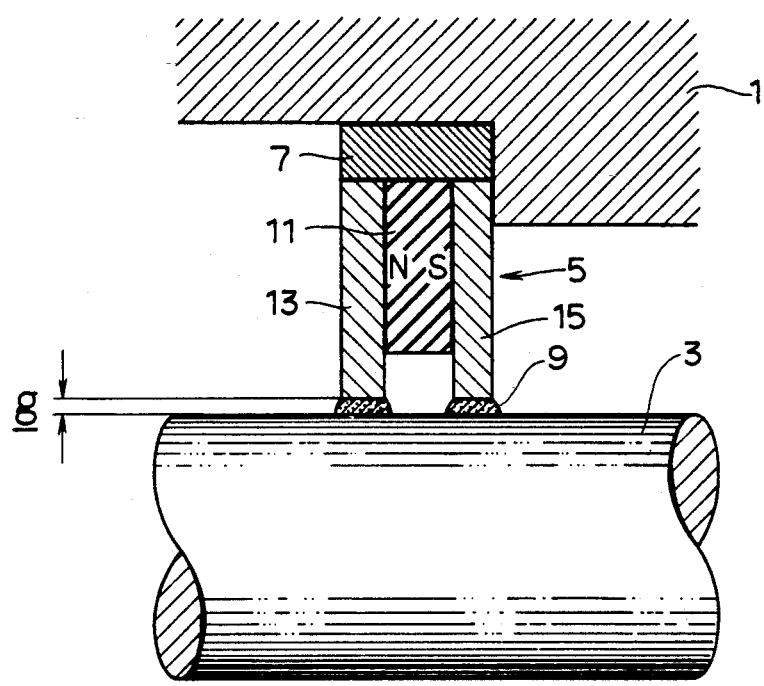
FIG. 1 is a cross-sectional view showing conventional sealing device.
Figure 2:
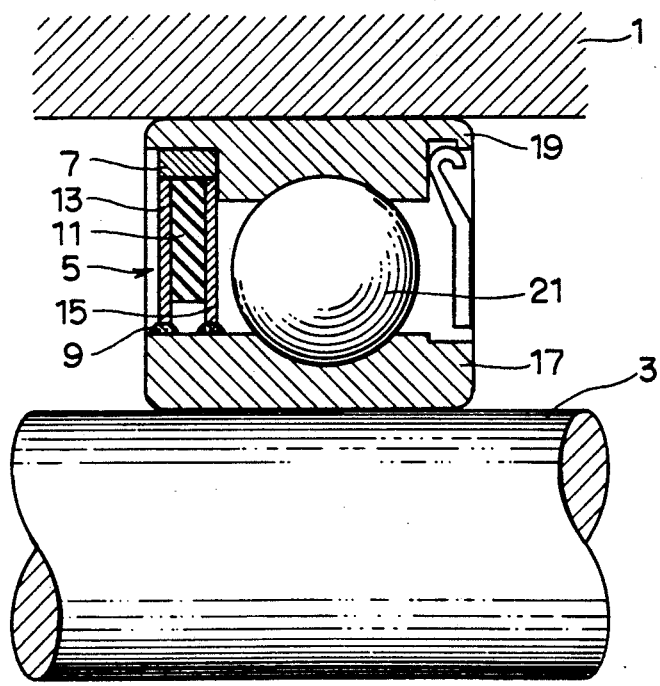
FIG. 2 is a cross-sectional view showing an example of an application of the sealing device of the embodiment as shown in FIG. 1 to a bearing assembly.

Now preferable embodiments are described referring to the attached drawings in which like reference numerals are used for like members throughout the drawings.

Figure 3:
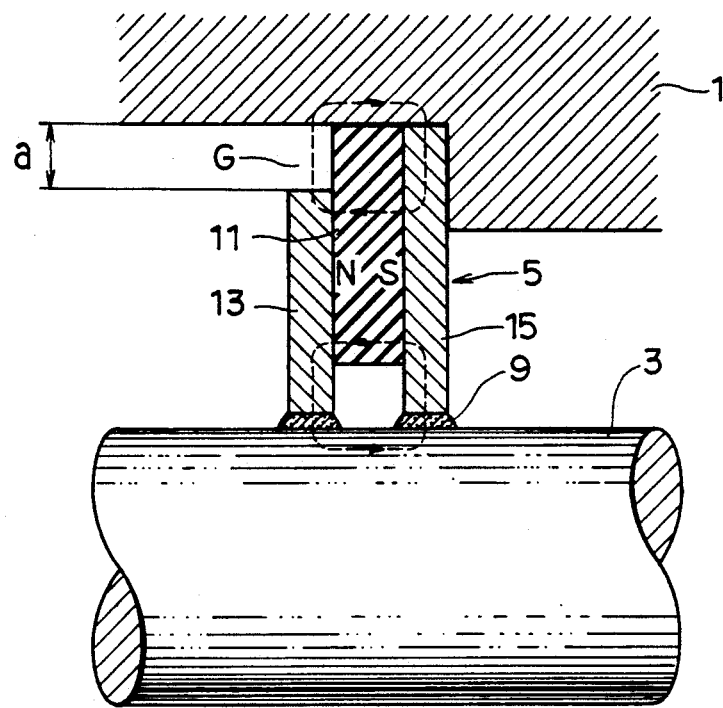
FIG. 3 is a cross-sectional view showing one embodiment of the present invention.

In FIG. 3, disposed between a housing 1, which is a first magnetic member of the present invention, and a shaft 3, which is a second magnetic member of the present invention is a ferrofluid seal device 5 comprising an annular permanent magnet 11 magnetized in the axial direction, a pair of annular pole pieces 13 and 15 between which the permanent magnet 11 is integrally inserted and a ferrofluid 9 disposed between the pole pieces 13 and 15 and the shaft 3. One of the pole pieces 13 is of such a length that a spacing section or air gap G is formed between the housing 1 and the pole piece 13 when the seal device 5 is installed on the housing 1. Accordingly, the pole piece 13 is partially cut away at its radially outer end and when compared with the other pole piece 15, is shorter in the radial direction side by a predetermined radial length a. The spacing section G with the radial length a serves to prevent a magnetic flux path extending through the housing 1 from being produced.

In operation, the magnetic flux which is caused to flow from the pole pieces 13 and 15 to the housing 1 by the permanent magnet 11 is blocked by the spacing section G, which is substantially larger than gap g so that a strong magnetic field is produced to flow through the gap g between the pole pieces 13 and 15 and the shaft 3. Consequently the ferrofluid 9 is firmly maintained in the gap g by means of the high magnetic field, which has substantially the same magnetic force as the conventional example shown in FIG. 1.

Consequently, it will be understood that the spacing section G is essentially equivalent to the ring spacer 7 made from a nonmagnetic body in the device shown in FIG. 1, and that in the case of this embodiment, it is unnecessary to use the spacer ring 7, whereby there is a reduction in the parts used and it is possible to reduce the material costs.

Figure 5:
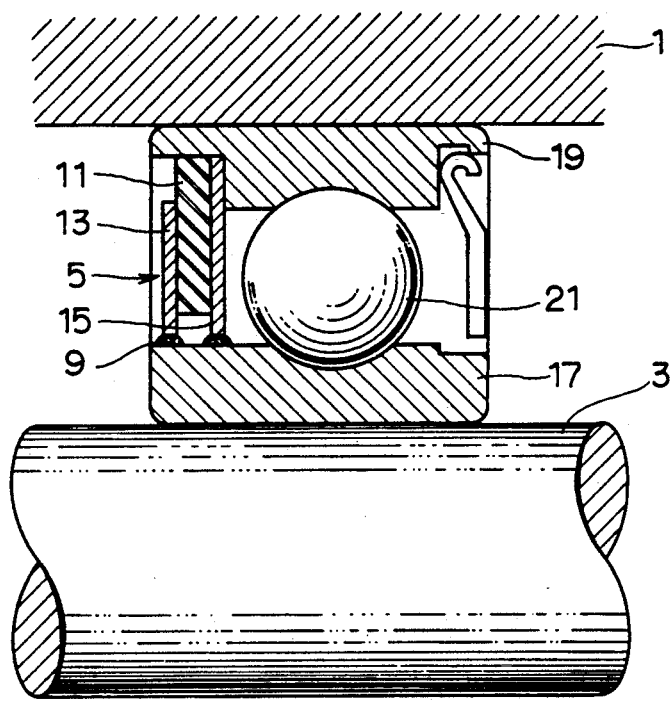
FIG. 5 is a cross-sectional view showing an example of an application of the sealing device of the embodiment of FIG. 3 to a bearing assembly.

In addition, in the case of this embodiment, by a reduction in the number of parts the work of installation in the housing 1 is also reduced and installation is made easy. In particular, even with a bearing assembly as shown in FIG. 5, where the space is narrow between an outer race 19 (first magnetic member) and an inner race 17 (second magnetic member) for holding a ball 21 therebetween, the installation is easily performed.

Further, the precision in installing the ferrofluid seal device 5 on the housing 1 has a strong relationship with the distance between the two members 1 and 3 only, so that even with a narrow space between the outer race 19 and the inner race 17 as in the above-mentioned bearing assembly, the ferrofluid seal device 5 can be precisely installed.

Figure 4:
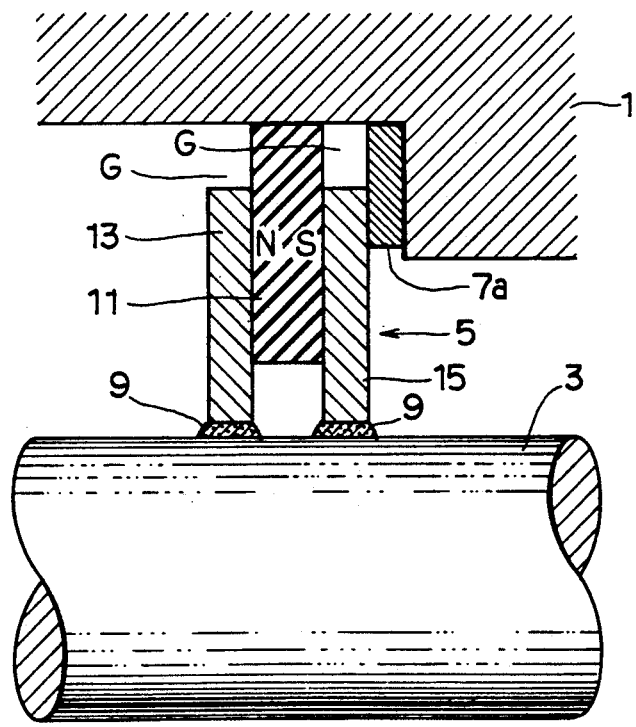
FIG. 4 is a cross-sectional view of another embodiment of the present invention.

FIG. 4 illustrates another embodiment of the present invention.

In this embodiment, a ferrofluid seal device 5 is used, in which the pole piece 13 is of the same size as the pole piece 15, so that the spacing section G is provided between the two pole pieces 13 and 15 and the housing 1, respectively. Furthermore, a nonmagnetic spacer 7a is interposed axially between the pole piece 15 and housing 1. The resulting effects in this embodiment does not substantially differ from the previous embodiment, except that the force to hold the ferrofluid is increased in this embodiment because the space section G is provided at two locations between the pole pieces 13 and 15 and the housing 1.

Figure 6:
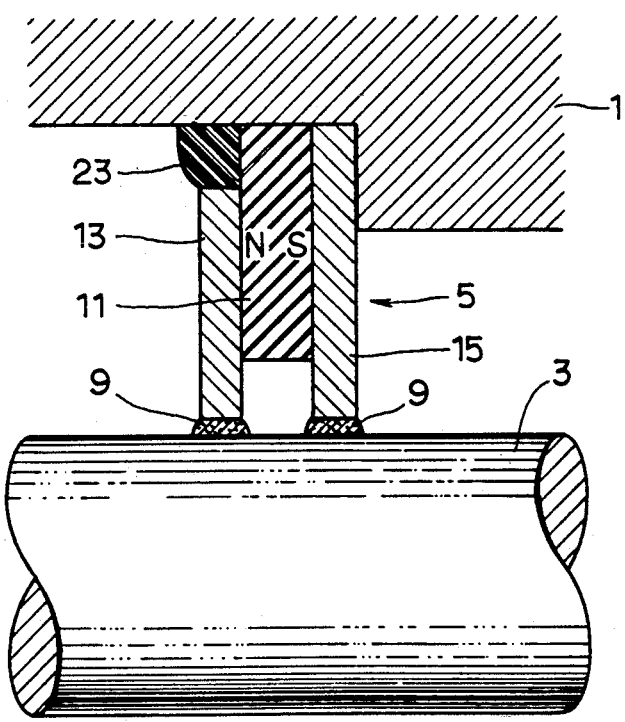
FIG. 6 is a cross-sectional view showing another embodiment of the present invention.

Another embodiment is illustrated in FIG. 6, in which the radially outer gap G between the housing 1 and the pole piece 13 as in FIG. 3 is filled with a bonding agent 23. The bonding agent 23 serves to completely prevent any foreign material from entering the inside space through the sealing device. Without the bonding agent 23 as in FIG. 3, foreign materials such as splashes of grease which have penetrated through small clearances between the housing 1 and the pole piece 15 and the magnet 11 could pass through the gap G into the inside space which must be kept clean because a H.D. device is accomodated in it.

Figure 7:
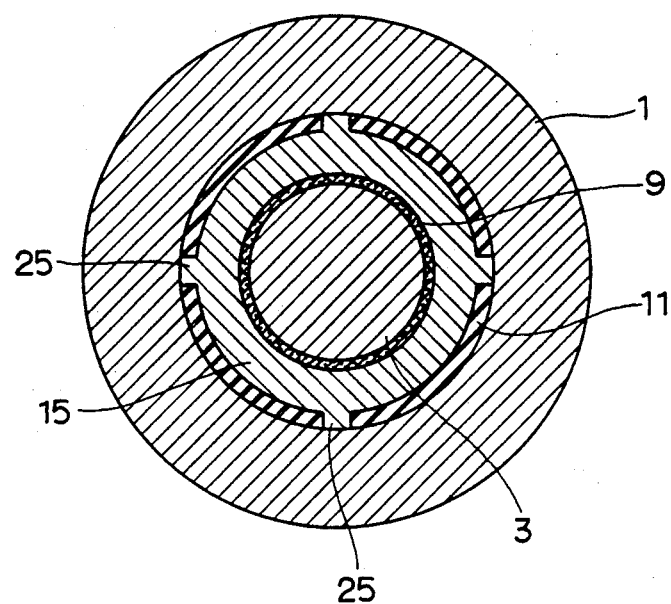
FIG. 7 is a cross-sectional view showing another embodiment of the present invention.

In the embodiment as shown in FIG. 7 which shows a cross sectional view taken along a line crossing the shaft 3 and extending through the pole piece 13, a plurality of projections 25 for positioning are provided on the outer peripheral surface of the pole piece 13. The projections 25 are abutted against the inner surface of the housing 1 so as to keep the pole piece 15 and therefore the ferrofluid seal device 5 in place with reference to the housing 1. In this embodiment, there is a magnetic flux path through the pole piece 13, specifically the projection 25, the pole piece 15 and the housing 1 as shown in the prior art device. However, since the surface area of the projections is limited and extremely smaller than the outer peripheral surface of the pole piece 15, there is no practical problem in magnetic flux leaking.

Figure 8:
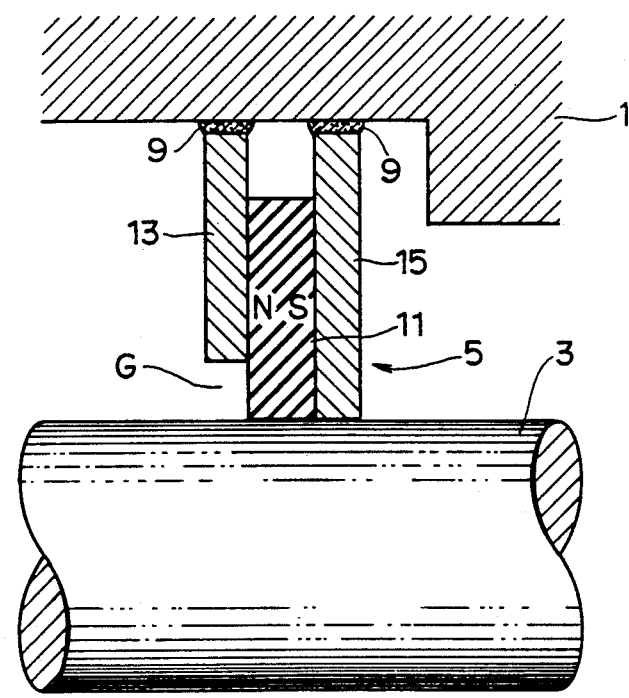
FIG. 8 is a cross-sectional view showing another embodiment of the present invention.

In the embodiment as shown in FIG. 8, the ferrofluid seal device 5 is supported by the shaft 3 through tight fitting, and the ferrofluid 9 is provided between the housing 1 and the pole pieces 13 and 15 at the outer end thereof. Thus, this embodiment makes it possible to rotate the housing 1 relative to the assembly of the shaft 3 and the pole pieces 13 and 15. There is an air gap G provided between the pole piece 13 and the shaft 3, and the air gap G can be filled with a bonding agent 23 as shown in FIG. 6.

Figure 9:
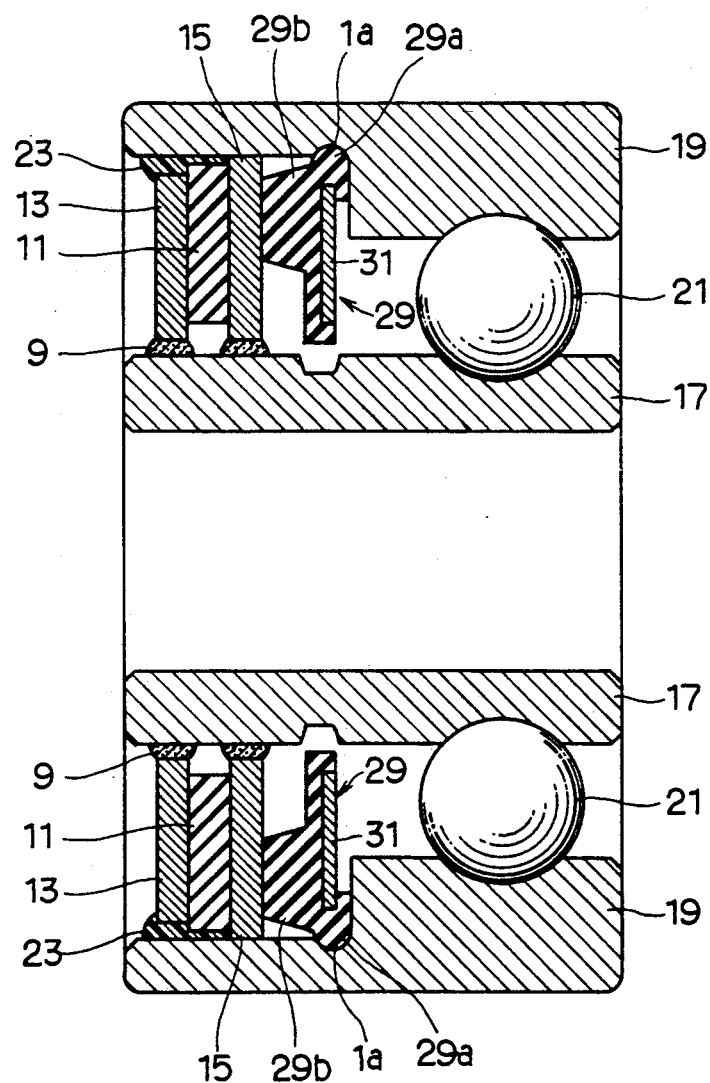
FIG. 9 is a cross-sectional view showing another embodiment of the present invention.

In the embodiment as shown in FIG. 9, a grease seal plate member 27 is interposed between the ferrofluid seal device 5 and the ball bearing section including a plurality of balls 21. The grease seal plate member 27 consists of an elastomeric member 29 and a metal plate 31 embedded in the elastomeric member 29. The grease seal plate member 27 is used for sealing against the foreign material as described with respect to the bonding agent 23, specifically for preventing grease splashes from coming to the ferrofluid seal device 5, and in addition, serves to axially position the ferrofluid seal device 5 in place as described in detail hereinafter.

The elastomeric member 29 forming the grease seal plate member 27 is comprised of a mounting portion 29a provided along the outer peripheral portion of the metal plate 31 for reinforcing the grease seal plate member 27, a positioning portion 29b projected from the mounting portion 29a in a lateral direction and a skirt portion 29c extended toward the inner periphery of the grease seal plate member 27.

The outer periphery of the mounting portion 29a is a portion of the inner peripheral surface of the outer race 19, and engaged with the recessed groove is formed adjacent to the ball bearing section. Accordingly, the grease seal plate member 27 is securely placed in an axial positioning relationship with reference to the outer race 19. The positioning portion 29b is engaged with the pole piece 15 at its side surface which is closer to the ball bearing section than the pole piece 13, the pair of the pole piece 15 and the pole piece 13 forming the ferrofluid seal device 5, whereby the pole piece 15 is separated from the skirt portion 29c by the positioning portion 29b. Consequently, a pocket 32 with sufficient volume is defined between the side surface of the skirt portion 29c and the side surface of the pole piece 15.

As is clear in the description set forth above, the pole piece 15 is subjected to centering (positioning in a radial direction) through engagement of the inner peripheral surface of the outer race 19 and the outer peripheral edge of the pole piece 15, and to positioning in an axial direction through engagement of the pole piece 15 and the positioning portion 29b of the elastomeric member 29.

On the other hand, a second recessed groove 30 is formed generally along the outer peripheral surface of the inner race 17 at a position opposed to the skirt portion 29c of the elastomeric member 29. Accordingly, a labyrinth seal space 33 is formed between the inner peripheral edge of the skirt portion 29c and the second recessed groove 30. A narrow passage 35a is formed between the labyrinth seal space 33 and the pocket 32, while a narrow passage 35b is formed between the labyrinth seal space 33 and a space 34 on the ball bearing side. Consequently, splashes of grease produced within the space 34 on the ball bearing side have to pass all of the narrow passage 35b, the wide labyrinth seal space 33, the narrow passage 35a and the wide pocket 32 before they reach the ferrofluid seal device 5. Thus, it should be readily understood that fluid is deenergized when the fluid passes alternatively through the narrow portions and the partions, in another words, that the fluid in the space 34 on the ball bearing side hardly reaches the side of the pocket 32, which are phenomena appearing as a result of the shield and labyrinth effects of the skirt portion 29c.

In addition, it should be readily understood that the grease seal plate member 27 shown in FIG. 9 can be applied not only to the ferrofluid seal device of the present invention as mentioned above but also to conventional ferrofluid seal devices in order to position them.

As outlined in the above explanation, by means of the present invention, when a sealing device is installed on the first magnetic member which moves relative to the second magnetic member with a predetermined spacing therebetween, because an air gap is provided between the pole pieces and the first magnetic member, even in the case where the space between the first and second magnetic members is narrow, it is possible to install the sealing device easily and with good precision.

In addition, splashes of the grease produced in the ball bearing section are effectively prevented from reaching the ferrofluid seal device and from entering the ferrofluid through the adoption of the structure as shown in FIG. 9, whereby the durability of the ferrofluid is improved. In addition, the air gap can be filled with a bonding agent for complete sealing.

This sealing device is used with the following effects.

(1) The magnetic flux which is generated by the permanent magnet 11 and flows from the pole piece 13 and 15 to the first magnetic member 1, is blocked by the spacing section or air gap G with low magnetic permeability, so that a strong magnetic field is produced in the gap g between the pole piece 13 and 15 and the second magnetic member 3. For this reason the ferrofluid 9 is retained in the gap g from the effect of the high magnetic field, and its pressure resistance becomes high.

(2) The magnetic flux which flows between the first magnetic member 1 and the pole pieces 13 and 15 is blocked by the spacing section G, so that the nonmagnetic ring spacer which is used in the conventional devices becomes unnecessary, making it possible to reduce the parts used, and this reduce cost.

(3) Because the conventional nonmagnetic ring spacer 7 becomes unnecessary, the number of parts used is reduced, and the ferrofluid seal device 5 is easily installed on the first magnetic member. In particular, this installation is easily performed even when the space between the first and second magnetic members 1 and 3 is narrow.

(4) In addition, because the conventional nonmagnetic ring spacer 7 becomes unnecessary, the precision of installing the ferrofluid seal device 5 on the first magnetic member 1 has a strong relationship with the space between the two magnetic members. Consequently, as outlined above, even when the space between the first and second magnetic members 1 and 3 is small, the ferrofluid seal device 5 can be accurately installed between them.

It should be understood that either of the housing and tha shaft can be rotated in the embodiments mentioned above, although the sealing device better be securely mounted to the stationary housing.

There would be many modifications to be made by a person skilled in the art within the scope of the present invention.

What is claimed is:

1. A sealing device for use between a first magnetic member and a second magnetic member, each having a respective peripheral surface and which are concentrically disposed to each other to define a space having a predetermined radial length between said peripheral surfaces so as to move relative to one another, comprising:
   a) a magnetic sealing unit having a peripheral surface and comprising an axially magnetized permanent magnet provided within said space between said first and said second magnetic members, said magnet having first and second peripheral edges, first and second magnetically permeable pole pieces axially juxtaposed within said space between said first and second magnetic members with said permanent magnet interposed therebetween and in surface contact with each pole piece, each magnetically permeable pole piece having first and second peripheral edges;
   b) a contact section constructed such that part of said peripheral surface of said first magnetic member comes into contact with at least one of 1) the peripheral edge of said permanent magnet which is opposed to said peripheral surface of said first magnetic member and 2) the second peripheral edge of one of said pole pieces, whereby said magnetic sealing unit is supported by said first magnetic member;
   c) a pair of first radial gaps defined between said first peripheral edges of said first and second magnetically permeable pole pieces and said peripheral surface of said second magnetic member;
   d) a magnetic fluid retained only within said pair of said first radial gaps by magnetic forces generated from said permanent magnet;
   e) a second radial gap defined between said peripheral surface of said first magnetic member and said second peripheral edge of at least one of said first and second magnetically permeable pole pieces, and said second radial gap having a size substantially larger than said first radial gaps; and
   f) wherein magnetic fluxes through said first radial gaps are reinforced due to the existence of said second radial gap, whereby a maximum of sealing force is obtained through the magnetic fluid in the space having the predetermined radial length.

2. The sealing device of claim 1, wherein said first magnetic member is a housing and said second magnetic member is a shaft.

3. The sealing device of claim 2, wherein one of said first and second pole pieces is in contact with said first magnetic member, and the other of said pole pieces is shorter than said predetermined radial length of said space to provide said second radial gap between said other of said pole pieces and said first magnetic members.

4. The sealing device of claim 3, wherein said second radial gap is filled with a bonding agent.

5. The sealing device of claim 3, wherein a plurality of spaced-apart projections are formed on said second peripheral edge of said other of said pole pieces, and said projections are in contact with said first magnetic member for positioning, and the total surface area of said projections is smaller than the surface area of said peripheral edge.

6. The sealing device of claim 2, wherein one of said pole pieces is in contact with said first magnetic member through an axial spacing member, and both of said pole pieces are shorter than said predetermined radial length of said space to provide said second gap between said pole pieces and said first magnetic member.

7. The sealing device of claim 6, wherein said second radial gap is filled with a bonding agent.

8. The sealing device of claim 6, wherein a plurality of spaced-apart projections are formed on said second peripheral edge of said other of said pole pieces, and said projections are in contact with said first magnetic member for positioning, and the total surface area of said projections is smaller than the surface area of said peripheral edge.

9. The sealing device of claim 2, wherein said second radial gap is filled with a bonding agent.

10. The sealing device of claim 1, wherein said first magnetic member is an outer race of a ball bearing assembly, and said second magnetic member is an inner rage of said ball bearing assembly.

11. The sealing device of claim 10, wherein one of said first and second pole pieces is in contact with said first magnetic member, and the other of said pole pieces is shorter than said predetermined radial length of said space to provide said second radial gap between said other of said pole pieces and said first magnetic member.

12. The sealing device of claim 11, wherein said second radial gap is filled with a bonding agent.

13. The sealing device of claim 11, wherein a plurality of spaced-apart projections are formed on said second peripheral edge of said other of said pole pieces, and said projections are in contact with said first magnetic member for positioning, and the total surface area of said projections is smaller than the surface area of said peripheral edge.

14. The sealing device of claim 10, wherein one of said pole pieces is in contact with said first magnetic member through an axial spacing member, and both of said pole pieces are shorter than said predetermined radial length of said space to provide said second gap between said pole pieces and said first magnetic member.

15. The sealing device of claim 14, wherein said second radial gap is filled with a bonding agent.

16. The sealing device of claim 14, wherein a plurality of spaced-apart projections are formed on said second peripheral edge of said other of said pole pieces, and said projections are in contact with said first magnetic member for positioning, and the total surface area of said projections is smaller than the surface area of said peripheral edge.

17. The sealing device of claim 10, wherein said second radial gap is filled with a bonding agent.

18. The sealing device of claim 1, wherein one of said first and second pole pieces is in contact with said first magnetic member, and the other of said pole pieces is shorter than said predetermined radial length of said space to provide said second radial gap between said other of said pole pieces and said first magnetic member.

19. The sealing device of claim 18, wherein said second radial gap is filled with a bonding agent.

20. The sealing device of claim 18, wherein a plurality of spaced-apart projections are formed on said second peripheral edge of said other of said pole pieces, and said projections are in contact with said first magnetic member for positioning, and the total surface area of said projections is smaller than the surface area of said peripheral edge.

21. The sealing device of claim 1, wherein one of said pole pieces is in contact with said first magnetic member through an axial spacing member, and both of said pole pieces are shorter than said predetermined radial length of said space to provide said second gap between said pole pieces and said first magnetic member.

22. The sealing device of claim 21, wherein said second radial gap is filled with a bonding agent.

23. The sealing device of claim 21, wherein a plurality of spaced-apart projections are formed on said second peripheral edge of said other of said pole pieces, and said projections are in contact with said first magnetic member for positioning, and the total surface area of said projections is smaller than the surface area of said peripheral edge.

24. The sealing device of claim 1, wherein said first magnetic member is a shaft and said second magnetic member is a housing, and one of said pole pieces is fitted onto said shaft, and the other of said pole pieces is shorter than said predetermined radial length of said space to provide said second gap between said other of said pole pieces and said shaft.

25. The sealing device of claim 1, wherein said second radial gap is filled with a bonding agent.

* * * * *